(12) United States Patent
Chen

(10) Patent No.: US 9,618,987 B2
(45) Date of Patent: Apr. 11, 2017

(54) KEYBOARD MODULE AND NOTEBOOK COMPUTER WITH THE SAME

(71) Applicant: Primax Electronics Ltd., Neihu, Taipei (TW)

(72) Inventor: Bo-An Chen, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 65 days.

(21) Appl. No.: 14/691,894

(22) Filed: Apr. 21, 2015

(65) Prior Publication Data
US 2016/0224078 A1 Aug. 4, 2016

(30) Foreign Application Priority Data
Jan. 30, 2015 (TW) .............................. 104103191 A

(51) Int. Cl.
| G06F 1/16 | (2006.01) |
| G06F 1/20 | (2006.01) |
| H01H 13/14 | (2006.01) |
| H01H 13/10 | (2006.01) |
| H01H 13/70 | (2006.01) |
| H01H 13/704 | (2006.01) |

(52) U.S. Cl.
CPC ............ *G06F 1/203* (2013.01); *G06F 1/1632* (2013.01); *G06F 1/1662* (2013.01); *H01H 13/10* (2013.01); *H01H 13/14* (2013.01); *H01H 13/70* (2013.01); *H01H 13/704* (2013.01); *H01H 2215/006* (2013.01); *H01H 2221/044* (2013.01); *H01H 2233/008* (2013.01)

(58) Field of Classification Search
CPC .. H05K 7/20336; H05K 7/209; G06F 1/1662; G06F 1/181; G06F 1/203; G06F 1/1632; H01H 13/10; H01H 13/14; H01H 13/70; H01H 2233/008; H01H 2221/044; H01H 2215/006; H01H 13/704
USPC ............ 361/679.01, 679.02, 679.08, 679.09; 345/168–172; 341/22–33; 400/472–496
See application file for complete search history.

(56) References Cited

U.S. PATENT DOCUMENTS

| 6,130,388 | A | * | 10/2000 | Nishijima | ............. | G06F 1/1616 |
| | | | | | | 200/293 |
| 2002/0014398 | A1 | * | 2/2002 | Ito | .......................... | H01H 3/125 |
| | | | | | | 200/344 |
| 2003/0170061 | A1 | * | 9/2003 | Ito | .......................... | H01H 3/125 |
| | | | | | | 400/472 |

(Continued)

*Primary Examiner* — Anthony Haughton
*Assistant Examiner* — Ingrid Wright
(74) *Attorney, Agent, or Firm* — Kirton McConkie; Evan R. Witt

(57) ABSTRACT

A keyboard module includes plural keys, a switch circuit board and a metallic bottom plate. The plural keys and the switch circuit board are disposed on the metallic bottom plate. The metallic bottom plate includes a first metal plate and a second metal plate. The first metal plate and the second metal plate are made of different metallic materials. Consequently, the metallic bottom plate has the two kinds of metallic characteristics. According to the consumer's requirements, the manufacturer of the keyboard module may select suitable metallic materials to produce the desired metallic bottom plate. Consequently, the metallic bottom plate will possess different functions.

8 Claims, 8 Drawing Sheets

(56) References Cited

U.S. PATENT DOCUMENTS

| | | | |
|---|---|---|---|
| 2007/0084709 A1* | 4/2007 | Koyano | H01H 9/52 |
| | | | 200/341 |
| 2008/0142350 A1* | 6/2008 | Karaki | H01H 13/702 |
| | | | 200/512 |
| 2010/0090871 A1† | 4/2010 | Yeh | |

\* cited by examiner
† cited by third party

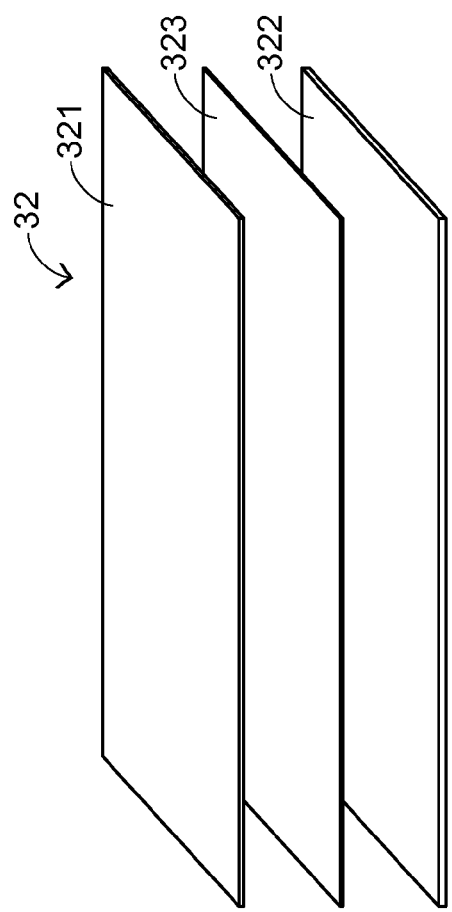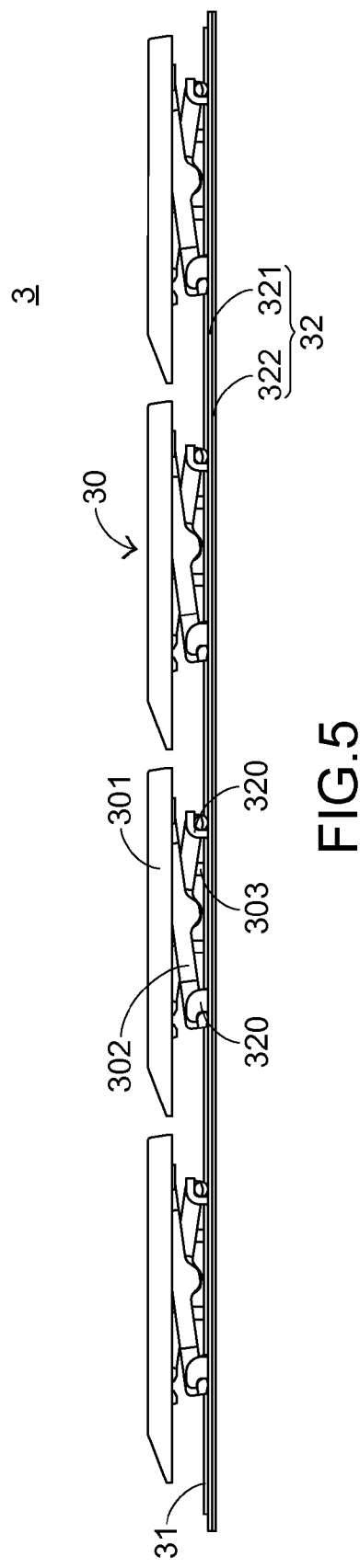

KEYBOARD MODULE AND NOTEBOOK COMPUTER WITH THE SAME

FIELD OF THE INVENTION

The present invention relates to a keyboard module, and more particularly to a slim-type keyboard module.

BACKGROUND OF THE INVENTION

Generally, the widely-used peripheral input device of a computer system includes for example a mouse device, a keyboard device, a trackball device, or the like. Via the keyboard device, characters and symbols can be inputted into the computer system directly. As a consequence, most users and most manufacturers of input devices pay much attention to the development of keyboard devices. The keyboard devices are classified into two types, i.e. the keyboard devices for desktop computers and the keyboard modules for notebook computers.

FIG. 1 is a schematic top view illustrating the outer appearance of a conventional keyboard module. As shown in FIG. 1, there are plural keys 10 on a surface of the conventional keyboard module 1. These keys 10 are classified into several types, e.g. ordinary keys 101, numeric keys 102 and function keys 103. When one of these keys 10 is depressed by the user's finger, a corresponding signal is issued to the computer, and thus the computer executes a function corresponding to the depressed key. For example, when an ordinary key 101 is depressed, a corresponding English letter or symbol is inputted into the computer. When a numeric key 102 is depressed, a corresponding number is inputted into the computer. In addition, the function keys 103 (F1~F12) can be programmed to provide various functions. The conventional keyboard module 1 is a keyboard device for a notebook computer.

Hereinafter, the inner structure of a conventional keyboard module will be illustrated in more details. FIG. 2 is a schematic cross-sectional view illustrating a conventional keyboard module. As shown in FIG. 2, the conventional keyboard module 2 comprises plural keys 20, a membrane switch circuit member 21 and a bottom plate 22. Each key 20 comprises a keycap 201, a scissors-type connecting element 202 and an elastic element 203. From top to bottom, the keycap 201, the scissors-type connecting element 202, the elastic element 203, the membrane switch circuit member 21 and the bottom plate 22 of the conventional keyboard module 2 are sequentially shown. The bottom plate 22 is used for supporting the keycaps 201, the scissors-type connecting elements 202, the elastic elements 203 and the membrane switch circuit member 21. For supporting these components, the bottom plate 22 is preferably made of a metallic material in order to provide the stronger structural strength. The conventional keyboard module 2 is a keyboard device for a notebook computer (not shown).

In the key 20, the keycap 201 is exposed outside the conventional luminous keyboard module 2, so that the keycap 201 can be depressed by the user. The scissors-type connecting element 202 is used for connecting the keycap 201 and the bottom plate 22. The elastic element 203 is penetrated through the scissors-type connecting element 202. In addition, both ends of the elastic element 203 are contacted with the keycap 201 and the membrane switch circuit member 21, respectively. The membrane switch circuit member 21 comprises an upper wiring board 211, a spacer layer 212, and a lower wiring board 213. The upper wiring board 211 has plural upper contacts 2111. The spacer layer 212 is disposed under the upper wiring board 211, and comprises plural perforations 2121 corresponding to the plural upper contacts 2111. The lower wiring board 213 is disposed under the spacer layer 212, and comprises plural lower contacts 2131 corresponding to the plural upper contacts 2111. The plural lower contacts 2131 and the plural upper contacts 2111 are collectively defined as plural key switches 214.

Recently, the general trends in designing electronic devices are toward slimness and light weightiness, and thus the conventional keyboard module needs to meet the requirements of slimness. For achieving this purpose, the manufacturers of the keyboard modules make efforts in minimizing the thickness of the keyboard modules. In accordance with the conventional approach, the thicknesses of the components (especially the bottom plate) of the keyboard module should be as small as possible. In addition to the reduction of the thickness of the bottom plate, another approach is to produce a keyboard module with a lighter bottom plate. For example, the bottom plate is made of aluminum. Although the use of the lighter bottom plate is effective to reduce the weight of the bottom plate, the structural strength of the aluminum bottom plate is weak. Consequently, the aluminum bottom plate is readily suffered from damage during the mold forming process.

Moreover, since the thickness of the electronic device is reduced, the inner space of the electronic device is reduced. Owing to the small inner space, some manufacturers of the keyboard modules may reduce the number of heat dissipating modules. Under this circumstance, the heat-dissipating efficiency is impaired.

Therefore, there is a need of providing an improved slim-type keyboard module in order to overcome the above drawbacks.

SUMMARY OF THE INVENTION

An object of the present invention provides a keyboard module having many characteristics and a notebook computer with the keyboard module. The characteristics include the combination of slimness, light weightiness and high heat-dissipating efficiency, the combination of slimness, light weightiness and high structural strength, the combination of high heat-dissipating efficiency and high structural strength, and so on.

In accordance with an aspect of the present invention, there is provided a keyboard module. The keyboard module includes plural keys, a switch circuit board and a metallic bottom plate. The plural keys are exposed to a top surface of the keyboard module. The switch circuit board is disposed under the plural keys. When the switch circuit board is triggered by the plural keys, plural key signals are correspondingly generated. The metallic bottom plate is connected with the plural keys, and supports the plural keys and the switch circuit board. The metallic bottom plate includes a first metal plate and a second metal plate. The first metal plate is made of a first metallic material. The second metal plate and the first metal plate are stacked on each other. The second metal plate is made of a second metallic material different from the first metallic material.

In accordance with another aspect of the present invention, there is provided a notebook computer. The notebook computer includes a heat dissipating module and a keyboard module. The heat dissipating module is disposed within the notebook computer. A heat generated by the notebook computer during operation is dissipated away by the heat dissipating module. The keyboard module is contacted with the heat dissipating module, and generates plural key signals. The keyboard module includes plural keys, a switch circuit board and a metallic bottom plate. The plural keys are exposed to a top surface of the keyboard module. The switch circuit board is disposed under the plural keys. When the switch circuit board is triggered by the plural keys, the plural key signals are correspondingly generated. The metallic bottom plate is connected with the plural keys, contacted with the heat dissipating module, and supports the plural keys and the switch circuit board. The metallic bottom plate includes a first metal plate and a second metal plate. The first metal plate is made of a first metallic material. The second metal plate and the first metal plate are stacked on each other. The second metal plate is contacted with the heat dissipating module so as to transfer the heat to the heat dissipating module. The second metal plate is made of a second metallic material different from the first metallic material.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 4 is a schematic exploded view illustrating a composite metallic structure of the metallic bottom plate of the keyboard module according to the first embodiment of the present invention;

FIG. 5 is a schematic cross-sectional view illustrating the keyboard module according to the first embodiment of the present invention;

DETAILED DESCRIPTION OF THE PREFERRED EMBODIMENT

For eliminating the drawbacks of the conventional technologies, the present invention provides a keyboard module.

Figure 1:
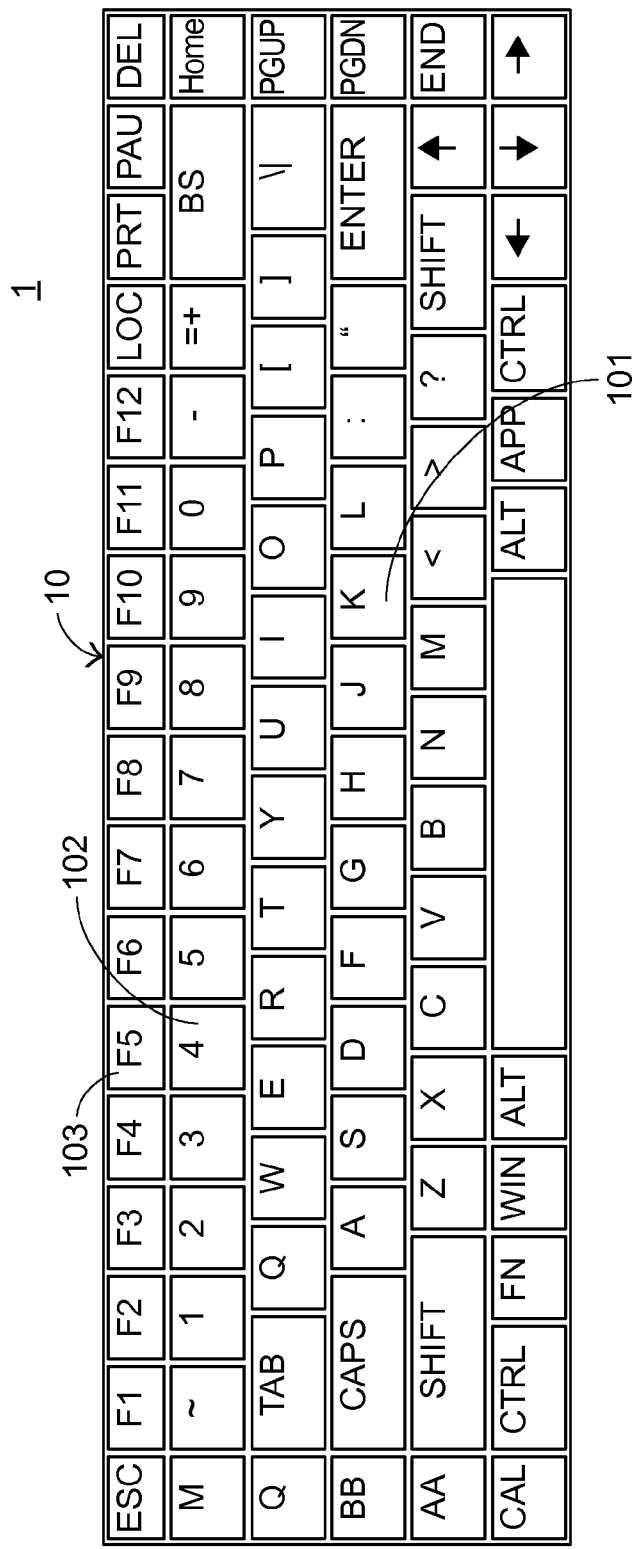
FIG. 1 is a schematic top view illustrating the outer appearance of a conventional keyboard module.
Figure 2:
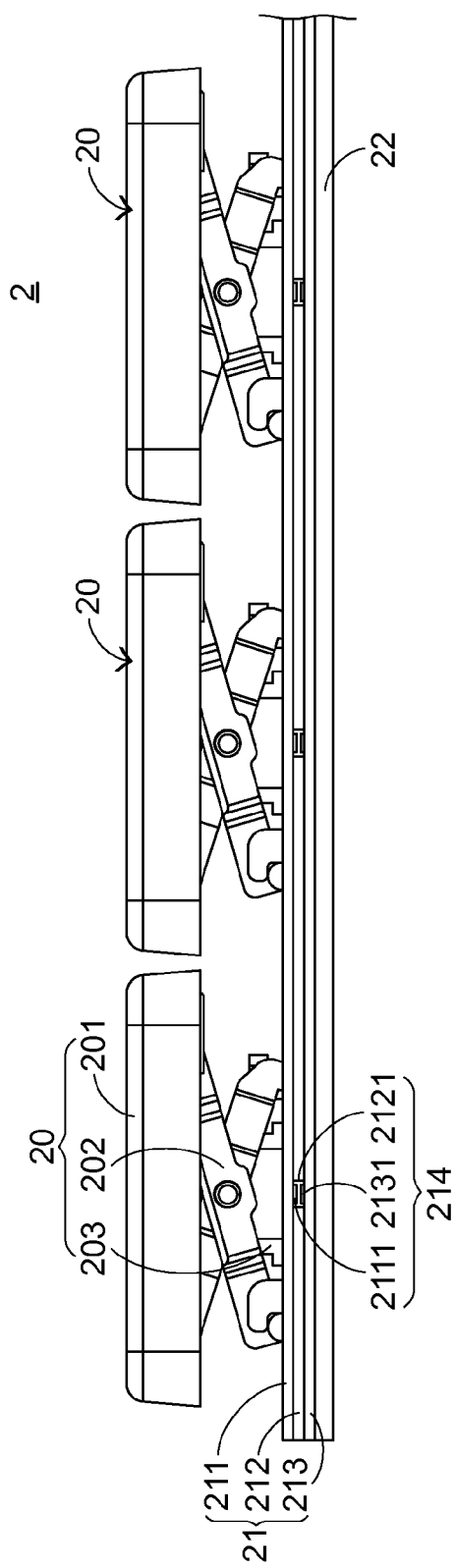
FIG. 2 is a schematic cross-sectional view illustrating a conventional keyboard module.
Figure 3:
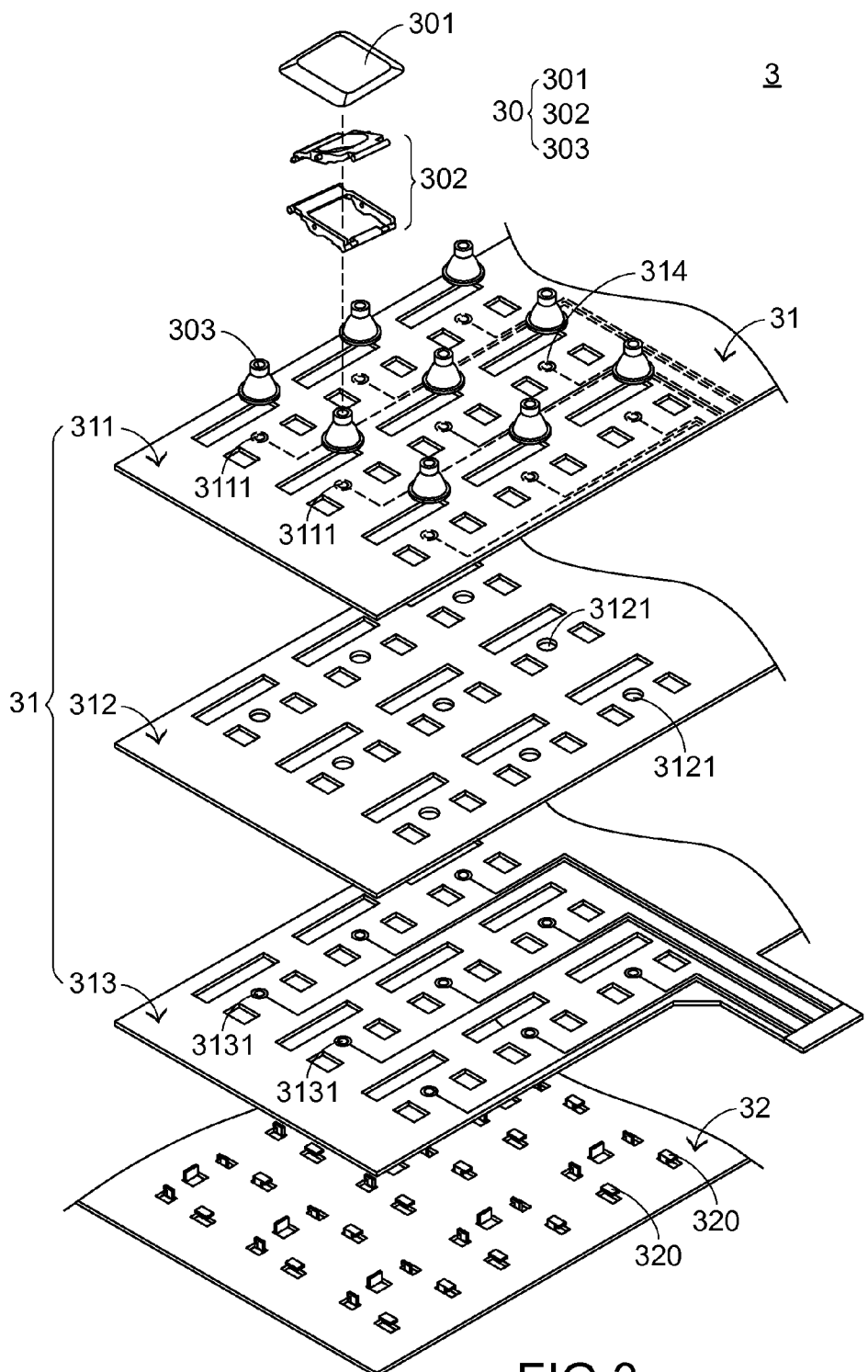
FIG. 3 is a schematic exploded view illustrating a portion of a keyboard module according to a first embodiment of the present invention.

FIG. 3 is a schematic exploded view illustrating a portion of a keyboard module according to a first embodiment of the present invention. As shown in FIG. 3, the keyboard module 3 comprises plural keys 30, a switch circuit board 31 and a metallic bottom plate 32. The plural keys 30 are partially exposed to a top surface of the keyboard module 3. When one of the plural keys 30 is depressed by the user, the depressed key 30 is moved relative to the metallic bottom plate 32. Each key 30 comprises a keycap 301, a connecting element 302 and an elastic element 303. The keycap 301 is exposed outside the top surface of the keyboard module 3 so as to be depressed by the user. The connecting element 302 is arranged between the metallic bottom plate 32 and the corresponding keycap 301. The connecting element 302 is used for connecting the metallic bottom plate 32 and the keycap 301 and allowing the keycap 301 to be moved upwardly or downwardly relative to the metallic bottom plate 32. The elastic element 303 is disposed under the corresponding keycap 301 and penetrated through the corresponding connecting element 302. The elastic element 303 is used for providing an elastic force. In response to the elastic force, the keycap 301 can be moved upwardly so as to be returned to its original position. In this embodiment, the keyboard module 3 is a keyboard device for a notebook computer. Moreover, the connecting element 302 is a scissors-type connecting element (also referred as a scissors member) that is swung with the movement of the keycap 301. Moreover, the elastic element 303 is a rubbery elastomer.

The switch circuit board 31 is arranged between the metallic bottom plate 32 and the plural keys 30. When the switch circuit board 31 is triggered by the plural keys 301, plural key signals are correspondingly generated. The switch circuit board 31 comprises an upper wiring board 311, a spacer layer 312 and a lower wiring board 313. The upper wiring board 311 comprises plural upper contacts 3111. The spacer layer 312 is disposed under the upper wiring board 311. Moreover, the spacer layer 312 comprises plural perforations 3121 corresponding to the plural upper contacts 3111. The lower wiring board 313 is disposed under the spacer layer 312. Moreover, the lower wiring board 313 comprises plural lower contacts 3131 corresponding to the plural upper contacts 3111. The plural upper contacts 3111, the plural perforations 3121 and the plural lower contacts 3131 are collectively defined as plural key switches 3024, respectively. When the switch circuit board 31 is pressed by the elastic element 303, a corresponding upper contact 3111 is inserted into the corresponding perforation 3121 and contacted with the corresponding lower contact 3131. Consequently, a corresponding key signal is generated. In this embodiment, the switch circuit board 31 is a membrane switch circuit board.

The metallic bottom plate 32 is disposed under the switch circuit board 31 for supporting the plural keys 30 and the switch circuit board 31. As shown in FIG. 3, the metallic bottom plate 32 comprises plural hooks 320 corresponding to the plural keys 30. The plural hooks 320 are used for connecting the corresponding connecting elements 302 so as to fix the keycaps 301 on the metallic bottom plate 32.

Hereinafter, the structure of the metallic bottom plate 32 will be illustrated with reference to FIGS. 3 and 4. FIG. 4 is a schematic exploded view illustrating a composite metallic structure of the metallic bottom plate of the keyboard module according to the first embodiment of the present invention. As shown in FIG. 4, the metallic bottom plate 32 comprises a first metal plate 321, a second metal plate 322 and a coupling element 323. The first metal plate 321 is made of a first metallic material. The second metal plate 322 is stacked on the first metal plate 321. Moreover, the second metal plate 322 is made of a second metallic material, which is different from the first metallic material. The coupling element 323 is arranged between the first metal plate 321 and the second metal plate 322. Via the coupling element 323, the first metal plate 321 and the second metal plate 322 are combined together. After the first metal plate 321, the coupling element 323 and the second metal plate 322 are arranged in the stacked form, a roll press process is performed on the first metal plate 321, the coupling element 323 and the second metal plate 322 so as to form a composite metallic structure of the metallic bottom plate 32. Afterwards, by stamping the composite metallic structure, plural hooks 320 are produced. Consequently, the metallic bottom plate 32 is produced. In an embodiment, the coupling element 323 is an adhesive layer.

After the plural keys 30, the switch circuit board 31 and the metallic bottom plate 32 are combined as the keyboard module 3, the resulting structure is shown in FIG. 5. When one of the plural keycaps 301 is depressed by the user, the keycap 301 is moved downwardly in response to an external force. As a consequence, the connecting element 302 is correspondingly swung. Moreover, as the keycap 301 is moved downwardly to push the elastic element 303, the elastic element 303 is compressed and subject to deformation. Consequently, the corresponding key switch 314 is triggered to generate the corresponding key signal. When the keycap 301 is no longer depressed by the user, the external force is no longer exerted on the elastic element 303. Consequently, the elastic element 303 is restored from the compressed state to the original state so as to provide the elastic force to push the keycap 301. In response to the elastic force, the keycap 301 is moved upwardly and the connecting element 302 is correspondingly swung. Consequently, the keycap 301 is moved to the original position before the keycap 301 is depressed.

The following two aspects should be specially described. Firstly, since the metallic bottom plate 32 is produced by stacking two kinds of metal plates, the metallic bottom plate 32 has two kinds of metallic characteristics. Some examples will be illustrated as follows. In a first example, the first metallic material is stainless steel, and the second metallic material is aluminum. The metallic bottom plate formed of these two metallic materials has both functions of higher structural strength and lighter weightiness. Consequently, the keyboard module has the benefits of slimness and light weightiness. In a second example, the first metallic material is stainless steel, and the second metallic material is copper. The metallic bottom plate formed of these two metallic materials has both functions of higher structural strength and higher heat-dissipating efficiency. In a third example, the first metallic material is stainless steel, and the second metallic material is zinc-plated steel. The metallic bottom plate formed of these two metallic materials has higher structural strength and has magnetism. In a fourth example, the first metallic material is aluminum, and the second metallic material is copper. The metallic bottom plate formed of these two metallic materials has both functions of lighter weightiness and higher heat-dissipating efficiency. In particular, the first metallic material is selected from one of stainless steel, aluminum, copper and zinc-plated steel, and the second metallic material is selected from one of stainless steel, aluminum, copper and zinc-plated steel but different from the first metallic material. Consequently, the metallic bottom plate has two different characteristics.

Secondly, in this embodiment, the metallic bottom plate 32 is produced by firstly placing the coupling element 323 between the first metal plate 321 and the second metal plate 322 and then pressing the combination of these components. It is noted that, however, those skilled in the art will readily observe that numerous modifications and alterations may be made while retaining the teachings of the invention. For example, in another embodiment, the metallic bottom plate is produced by firstly stacking the first metal plate and the second metal plate together and then thermally laminating the first metal plate and the second metal plate.

Figure 6:
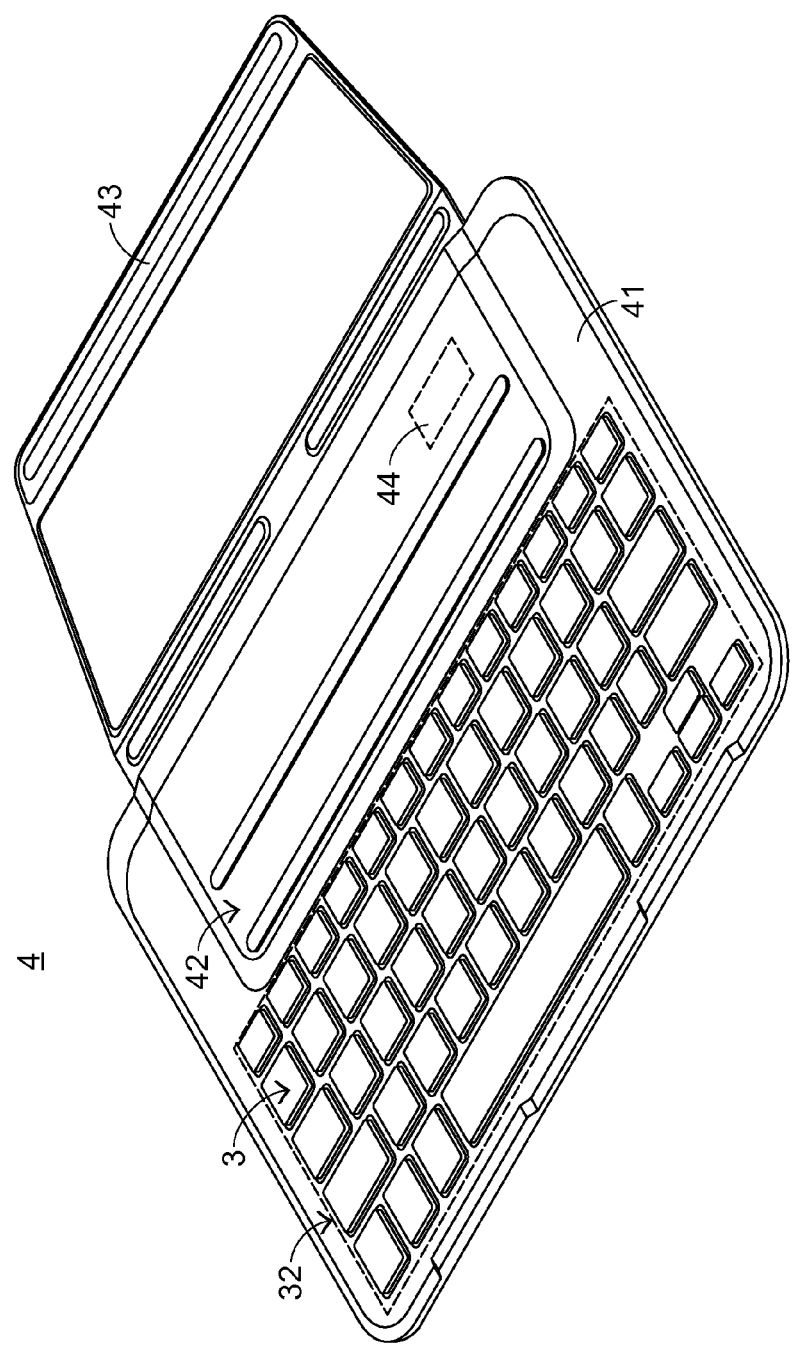
FIG. 6 is a schematic perspective view illustrating a keyboard module applied to a keyboard device according to a second embodiment of the present invention.

The present invention further provides a second embodiment. FIG. 6 is a schematic perspective view illustrating a keyboard module applied to a keyboard device according to a second embodiment of the present invention. In FIG. 6, the keyboard device 4 with the keyboard module 3 is shown. The keyboard device 4 is specially used for an electronic device 40 (see FIG. 7). The keyboard device 4 can support the electronic device 40. Moreover, the keyboard device 4 is in communication with the electronic device 40. By depressing one of the keys, a corresponding key signal is transmitted to the electronic device 40. The keyboard device 4 comprises the keyboard module 3, a supporting plate 41, an accommodation part 42, a fixing member 43 and a wireless transmission module 44. The structures of the keyboard module 3 are similar to those of the first embodiment, and are not redundantly described herein. The supporting plate 41 is used for supporting the keyboard module 3, the accommodation part 42, the fixing member 43 and the wireless transmission module 44. The accommodation part 42 is disposed on the supporting plate 41. The electronic device 40 may be placed on the accommodation part 42. Consequently, the user can watch a display screen 41 of the electronic device 40 while operating the keyboard module 3. When the fixing member 43 is combined with the electronic device 40, the electronic device 40 is supported by the fixing member 43. The wireless transmission module 44 is disposed within the supporting plate 41 and connected with the keyboard module 3. The wireless transmission module 44 is in wireless communication with the electronic device 40. By a wireless transmission technology, the key signal from the keyboard module 3 is transmitted to the electronic device 40 through the wireless transmission module 44.

In an embodiment, a magnetic element (not shown) within the electronic device 40 is magnetically attracted by the fixing member 43. Consequently, the electronic device 40 can be fixed by the fixing member 43. Moreover, the first metallic material is stainless steel, and the second metallic material is zinc-plated steel. Moreover, the electronic device 40 is a tablet computer. That is, the keyboard device 4 is a keyboard device specially used for the tablet computer.

Figure 7:
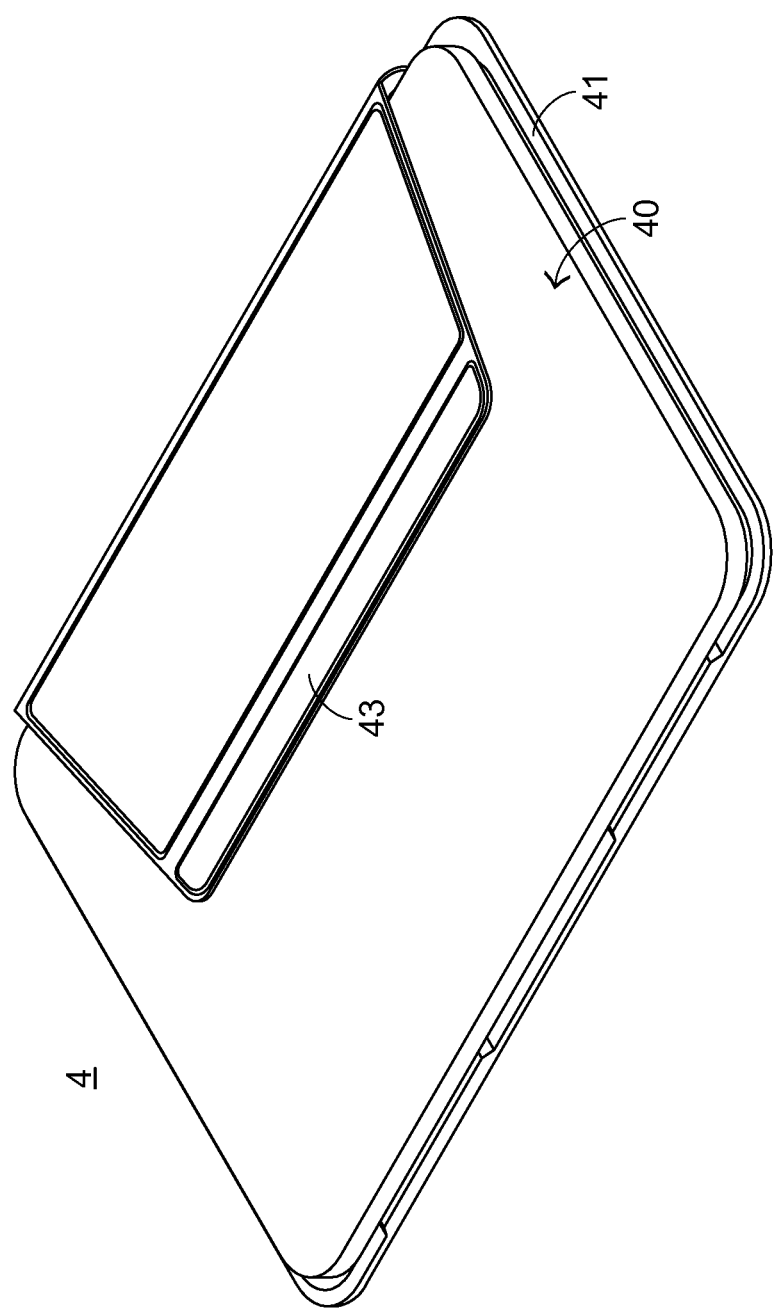
FIG. 7 is a schematic perspective view illustrating the keyboard module applied to the keyboard device and the electronic device according to the second embodiment of the present invention.

FIG. 7 is a schematic perspective view illustrating the keyboard module applied to the keyboard device and the electronic device according to the second embodiment of the present invention. As shown in FIG. 7, the electronic device 40 is fixed by the fixing member 43, and the electronic device 40 is placed on the keyboard module 3. Since the first metal plate 321 of the metallic bottom plate 32 is made of stainless steel, the first metal plate 321 is non-magnetic. However, since the second metal plate 322 is made of zinc-plated steel, the second metal plate 322 has magnetism. In this embodiment, the thickness of the first metal plate 321 is specially designed, so that the magnetism of the second metal plate 322 is not blocked by the thickness of the first metal plate 321. For example, the thicknesses of the first metal plate 321, the second metal plate 322 and the adhesive layer are about 0.1 mm, 0.1 mm and 0.03 mm, respectively. Consequently, the magnetic element within the electronic device 40 can be magnetically attracted by the second metal plate 322. Under this circumstance, as shown in FIG. 7, the electronic device 40 can be securely attached on the keyboard module 3.

Figure 8:
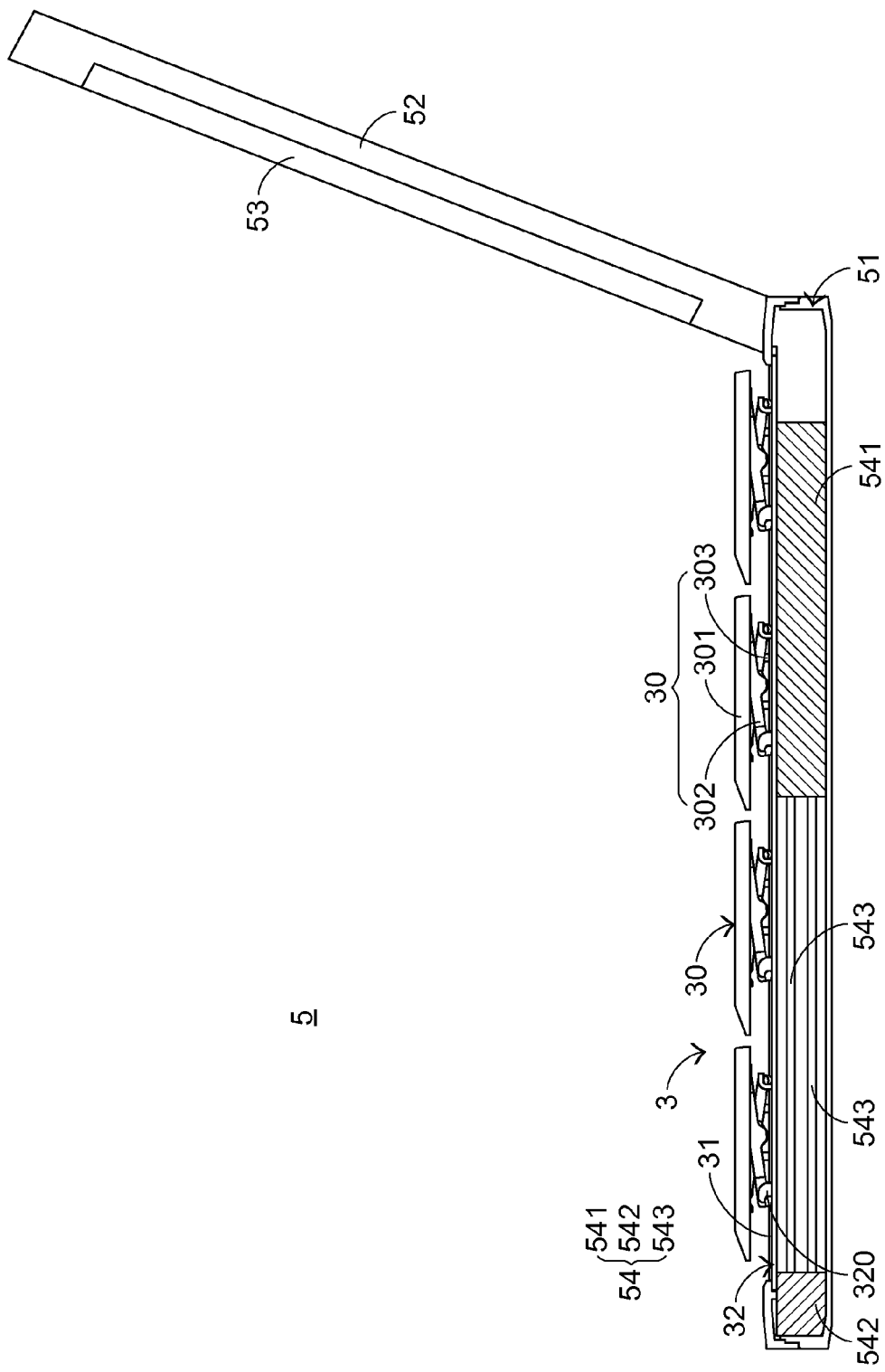
FIG. 8 is a schematic cross-sectional view illustrating a notebook computer with the keyboard module according to a third embodiment of the present invention.
Figure 9:
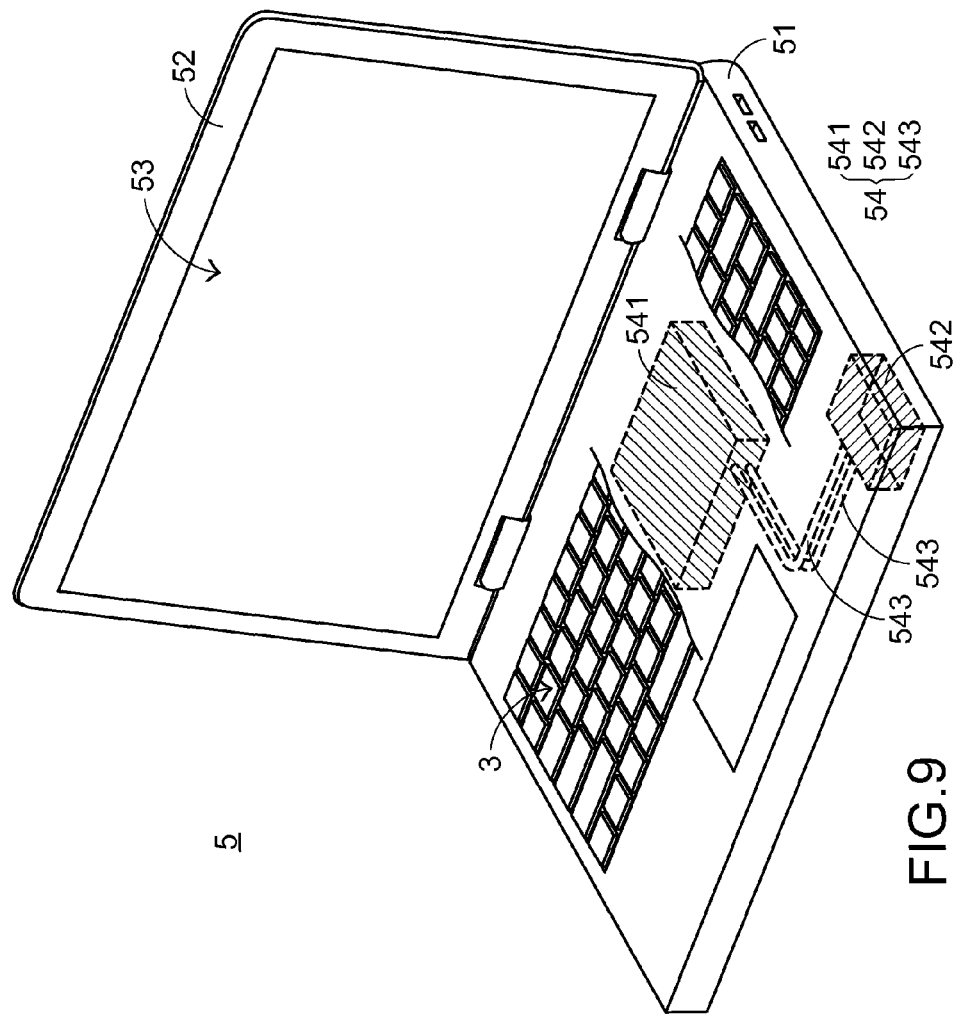
FIG. 9 is a schematic cross-sectional view illustrating a notebook computer with the keyboard module and a heat dissipating module according to the third embodiment of the present invention.

The present invention further provides a third embodiment. FIG. 8 is a schematic cross-sectional view illustrating a notebook computer with the keyboard module according to a third embodiment of the present invention. FIG. 9 is a schematic cross-sectional view illustrating a notebook computer with the keyboard module and a heat dissipating module according to the third embodiment of the present invention. Please refer to FIGS. 8 and 9. The notebook computer 5 comprises a keyboard module 3, a base 51, a top cover 52, a display screen 53 and a heat dissipating module 54. The keyboard module 3 is disposed on the base 51 and exposed outside the notebook computer 5. The structures and functions of the keyboard module 3 are similar to those of the first embodiment, and are not redundantly described herein. The top cover 52 is connected with the base 51 and rotatable relative to the base 51. When the base 51 is covered by the top cover 52, the notebook computer 5 is in a power off state or a hibernation state. On the other hand, when the top cover 52 is opened in the direction away from the base 51, the notebook computer 5 is in a normal working state. The display screen 53 is disposed on the top cover 52. An operating image of the notebook computer 5 can be shown on the display screen 53.

For clearly describing the heat dissipating module 54, some keys over the heat dissipating module 54 are not shown in FIG. 9. In fact, some keys are disposed over the heat dissipating module 54. In this embodiment, the heat dissipating module 54 is disposed within the base 51 and contacted with the metallic bottom plate 32 of the keyboard module 3. The heat generated by the notebook computer 5 during operation can be dissipated away by the heat dissipating module 54. In this embodiment, the heat dissipating module 54 comprises a passive heat dissipating element 541, an active heat dissipating element 542 and plural heat pipes 543. The passive heat dissipating element 541 is disposed within the base and contacted with the second metal plate 322 of the metallic bottom plate 32. The passive heat dissipating element 541 is used for absorbing the heat from the second metal plate 322. The active heat dissipating element 542 is located at a side of the base 51 and connected with the passive heat dissipating element 541. The active heat dissipating element 542 is used for dissipating the heat to the surroundings of the notebook computer 5. The plural heat pipes 543 are arranged between the passive heat dissipating element 541 and the active heat dissipating element 542. The heat absorbed by the passive heat dissipating element 541 may be transferred to the active heat dissipating element 542 through the plural heat pipes 543. In this embodiment, the passive heat dissipating element 541 is a heat dissipating block, and the active heat dissipating element 542 is a fan. Moreover, the first metallic material of the metallic bottom plate 32 is aluminum, and the second metallic material of the metallic bottom plate 32 is copper.

Please refer to FIGS. 8 and 9 again. When the notebook computer 5 is in the normal working state to continuously generate the heat, the heat is transferred to the passive heat dissipating element 541 through the second metal plate 322 of the metallic bottom plate 32 because the passive heat dissipating element 541 is contacted with the second metal plate 322 of the metallic bottom plate 32 and copper has high thermal conductivity. During operation of the active heat dissipating element 542, the heat is transferred from the passive heat dissipating element 541 to the active heat dissipating element 542 through the heat pipes 543, so that the heat is exhausted out of the base 51. That is, due to the high thermal conductivity of copper, the metallic bottom plate 32 of the keyboard module 3 becomes a portion of the heat dissipating path. Consequently, the heat-dissipating efficiency of the notebook computer 5 is enhanced.

From the above descriptions, the present invention provides the keyboard module and the notebook computer with the keyboard module. The metallic bottom plate of the keyboard module is produced by stacking two metal plates of different metallic materials. Consequently, the metallic bottom plate has two kinds of metallic characteristics. According to the consumer's requirements, the manufacturer of the keyboard module may select suitable metallic materials to produce the desired metallic bottom plate. Consequently, the metallic bottom plate will possess many characteristics. These characteristics include the combination of slimness, light weightiness and high heat-dissipating efficiency, the combination of slimness, light weightiness and high structural strength, the combination of high heat-dissipating efficiency and high structural strength, and so on.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A keyboard module, comprising:
   plural keys exposed to a top surface of the keyboard module;
   a switch circuit board disposed under the plural keys, wherein when the switch circuit board is triggered by the plural keys, plural key signals are correspondingly generated; and
   a metallic bottom plate connected with the plural keys, and supporting the plural keys and the switch circuit board, wherein the metallic bottom plate comprises a first metal plate and a second metal plate, wherein the first metal plate is made of a first metallic material, the second metal plate and the first metal plate are stacked on each other, and the second metal plate is made of a second metallic material different from the first metallic material, wherein the second metal plate of the metallic bottom plate is contacted with a passive heat dissipating element of a heat dissipating module, wherein a heat from the second metal plate of the metallic bottom plate is transferred to the passive heat dissipating element and dissipated to surroundings through an active heat dissipating element of the heat dissipating module.

2. The keyboard module according to claim 1, wherein the metallic bottom plate is produced by firstly stacking the first metal plate and the second metal plate together and then thermally laminating the first metal plate and the second metal plate; or the metallic bottom plate further comprises a coupling element between the first metal plate and the second metal plate so as to combine the first metal plate and the second metal plate together.

3. The keyboard module according to claim 1, wherein the second metallic material is copper, and the first metallic material is stainless steel, copper or zinc-plated steel.

4. The keyboard module according to claim 1, wherein the first metallic material is selected from one of stainless steel, aluminum, copper and zinc-plated steel, and the second metallic material is selected from one of stainless steel, aluminum, copper and zinc-plated steel but different from the first metallic material.

5. The keyboard module according to claim 1, wherein at least one key of the plural keys comprises:

a keycap disposed over the metallic bottom plate, wherein when the keycap is depressed, the keycap is moved relative to the metallic bottom plate;

a connecting element arranged between the metallic bottom plate and the keycap, wherein the metallic bottom plate and the keycap are connected with each other through the connecting element, so that the keycap is moved upwardly and downwardly relative to the metallic bottom plate; and an elastic element arranged between the metallic bottom plate and the keycap, penetrated through the connecting element, and contacted with the keycap to provide an elastic force to the keycap, wherein when the keycap is depressed, the elastic element is pushed by the keycap to trigger the switch circuit board, so that the corresponding key signal is generated.

6. A notebook computer with a keyboard module, the notebook computer comprising:

a heat dissipating module disposed within the notebook computer, wherein a heat generated by the notebook computer during operation is dissipated away by the heat dissipating module; and the keyboard module contacted with the heat dissipating module, and generating plural key signals, wherein the keyboard module comprises:

plural keys exposed to a top surface of the keyboard module;

a switch circuit board disposed under the plural keys, wherein when the switch circuit board is triggered by the plural keys, the plural key signals are correspondingly generated; and a metallic bottom plate connected with the plural keys, contacted with the heat dissipating module, and supporting the plural keys and the switch circuit board, wherein the metallic bottom plate comprises a first metal plate and a second metal plate, wherein the first metal plate is made of a first metallic material, the second metal plate and the first metal plate are stacked on each other, the second metal plate is contacted with the heat dissipating module so as to transfer the heat to the heat dissipating module, and the second metal plate is made of a second metallic material different from the first metallic material, wherein the heat dissipating module comprises:

a passive heat dissipating element contacted with the second metal plate, and absorbing the heat from the second metal plate;

an active heat dissipating element connected with the passive heat dissipating element, and dissipating the heat to surroundings of the notebook computer; and a heat pipe arranged between the passive heat dissipating element and the active heat dissipating element, wherein the heat absorbed by the passive heat dissipating element is transferred to the active heat dissipating element through the heat pipe.

7. The notebook computer according to claim 6, wherein the metallic bottom plate is produced by firstly stacking the first metal plate and the second metal plate together and then thermally laminating the first metal plate and the second metal plate; or the metallic bottom plate further comprises a coupling element between the first metal plate and the second metal plate so as to combine the first metal plate and the second metal plate together.

8. The notebook computer according to claim 6, wherein the second metallic material is copper, and the first metallic material is stainless steel, copper or zinc-plated steel.

* * * * *